United States Patent [19]

Farrow

[11] Patent Number: 4,831,229

[45] Date of Patent: May 16, 1989

[54] HIGH FREQUENCY RESISTANCE SPOT WELDING STRUCTURE AND METHOD

[75] Inventor: John F. Farrow, Plymouth, Mich.

[73] Assignee: Medar, Inc., Farmington Hills, Mich.

[21] Appl. No.: 938,976

[22] Filed: Dec. 8, 1986

[51] Int. Cl.$^4$ .............................................. B23K 11/10
[52] U.S. Cl. .................................. 219/117.1; 219/116; 219/120
[58] Field of Search ................ 219/61.2, 63, 116, 119, 219/117.1, 120

[56] References Cited

U.S. PATENT DOCUMENTS

| | | | |
|---|---|---|---|
| 553,923 | 2/1896 | Lemp | 219/116 |
| 2,680,180 | 6/1954 | Worden et al. | 219/63 |
| 4,130,750 | 12/1978 | Bennett et al. | 219/119 |
| 4,496,821 | 1/1985 | Burgher et al. | 219/116 |

*Primary Examiner*—Clifford C. Shaw
*Attorney, Agent, or Firm*—Dale R. Small & Associates

[57] ABSTRACT

High frequency resistance spot welding structure and method. In one embodiment, the structure includes dual, mirror image welding transformers, each including a transformer secondary circuit, an endless transformer core, and a transformer primary winding wound around the transformer core. The transformer secondary circuits may be single member, U-shaped transformer secondaries with integral electrode portions. In another embodiment, one of the transformers is replaced by a pair of spaced apart welding electrodes which are connected by a conductor. Means are provided for supplying welding pressure to the transformers to move them with their associated welding electrodes during a weld sequence. A high frequency, electrical welding signal is applied to the transformer primary circuits which are synchronized when two transformers are used so that the welding currents passing through the transformer secondary circuits reinforce each other. The structure is small and light weight so as to be inexpensive, positioned immediately adjacent a weld, and moved quickly. The method of the invention includes providing the high frequency welding signal to the mirror image, closely spaced apart welding structures, synchronizing the high frequency welding signal to provide push/pull welding and providing forging pressure through the transformers or transformer to move them with their associated electrodes during spot welding.

16 Claims, No Drawings

HIGH FREQUENCY RESISTANCE SPOT WELDING STRUCTURE AND METHOD

BACKGROUND OF THE INVENTION

1. Field of the Invention

The invention relates to resistance spot welding, and refers more specifically to a structure for and method of effecting resistance spot welding with small, light weight welding structure which may include dual, mirror image transformers having closely spaced apart unitary secondary circuits which may include integral electrode portions, utilizing synchronized high frequency, electrical resistance spot welding signals which reinforce each other to provide push/pull welding, which transformers are positioned on opposite sides of work pieces to be welded immediately adjacent welds to be effected and are moved toward and away from work pieces during welding whereby large, long leads between the welding transformers and welding electrodes are eliminated with consequent increase in efficiency of the welding.

2. Description of the Prior Art

In the past, resistance spot welding has usually been conducted at the normal 60 hertz, power line frequency. At such frequencies, the transformers utilized in the past have been quite large and heavy. Such welding transformers often weigh one hundred pounds or more each.

The size and weight of such equipment greatly reduces its usefulness in that it prevents it from being close to the weld area. Wherein transformers have been located at a substantial distance from a weld area, extra long conductors have been used in the past between the welding transformer and the welding electrodes.

Further, spot welding systems of the past have generally included a single transformer used to supply current to two welding electrodes positioned to apply current to work through which electrodes a forging force has been applied to push the work pieces to be welded together for welding at a desired temperature.

With such structure, two conductors of some sort are needed to carry welding current between the transformer output terminals and the welding electrodes. Because resistance welding requires high currents (from 5,000 to 50,000 or more amps), the conductors carrying the welding current must be large in cross section and made out of a good conductor of electricity, such as copper. This requirement makes resistance welding apparatus heavy, difficult to move around, and expensive. Often, water cooling for these conductors is required, further adding to cost and complexity.

These conductors may also help supply a rigid frame work to allow force to be applied to the welding electrodes while holding them in alignment with each other, an important consideration in resistance welding.

Because the welding electrodes must be movable in relation to each other to apply the required forging force, at least one of the conductors needs to be flexible in order to allow for such movement through some type of flexible or sliding joint. If a weld is desired in an area some distance from the edge of a work piece, the conductors need to be long enough to react across to the weld area. Wherein the work to be welded is moving, as on an automobile assembly line, the conductor between the transformer and the welding tips is a large, flexible cable.

The conductors connecting the welding transformer to the electrodes in prior resistance spot welding systems have been a significant source of inefficiency, particularly when they need to be long because of a large work piece and wherein flexible cables are used. It is not uncommon to have more than three quarters of the total energy coming from the welding transformer wasted as heat in the conductors due to resistive and conductive effects. In some applications, the voltage coming out of the welding transformer can be reduced as much as ninety five percent before it reaches the weld.

Also, wherein the area to be welded has been surrounded by a number of obstacles, special shaped conductors and/or electrodes have sometimes been required in the past. These special shaped members have been required to be conductive and strong so that in the past they have usually been metal, which has increased their cost and weight.

Further, the conductors between the welding transformer and electrodes in prior resistance spot welding systems have been a significant source of maintenance problems. The most troublesome area of the conductors has been the point where they flex to allow movement of the welding electrodes. Moving joints which carry large currents at such points cause machine breakdowns, as moving parts wear and fatigue.

A prior art welding structure, such as referred to above, is shown in FIG. 1. The welding structure 11 includes a generally C-shaped, heavy metal frame 13, and transformer 15 secured in a fixed position on the metal frame. The transformer 15 may include primary winding 17, a secondary winding 19 and a core generally indicated 21. Welding electrodes 23 and 25 are connected to the secondary winding 19 of the transformer 15 through conductors which include the upper platin 27, flexible conductor 29 and conductor 31, and lower platin 33 and frame means 35. As shown, the frame means 35 is movable vertically in a slide 37 on frame 13, in accordance with the adjustment of the knee support 39. The platin 27 is supported for vertical movement during welding on the ram 41 by means of the air or hydraulic actuating cylinder 43.

Thus, in operation of the prior art welding machine 11, as shown in FIG. 1, a 60 hertz electrical welding signal is applied to the primary winding 17 of the transformer 15, work pieces not shown are positioned between the electrodes 23 and 25, the platin 27 is moved downwardly as shown in FIG. 1 with the ram 41 on actuation of cylinder 43 while the conductor 29 flexes. On completion of a circuit through the work pieces between the welding electrodes 23 and 25, a high current, low voltage welding signal is passed through conductors 31, 29 and 27, the electrode 23, work pieces not shown, welding electrode 25 and conductors 33, 35 and 37 back to the transformer secondary 19. Such structure and operation is subject to the deficiencies for such apparatus of the prior art as set forth above..

SUMMARY OF THE INVENTION

In accordance with the present invention, a dual transformer, high frequency, resistance spot welding structure and method is provided. In accordance with the structure and method of the invention, the conductors between the welding transformer and electrodes are eliminated and the welding frequency is increased. with the increase in welding frequency, the transformers are made considerably smaller and lighter so as to be capable of being positioned immediately adjacent the weld area.

The structure of the invention comprises separate welding apparatus positioned in mirror image space relation so as to be on opposite sides of work pieces to be spot welded together. Each welding apparatus includes a welding transformer which in a preferred embodiment may have a single piece U-shaped transformer secondary circuit with integral electrode portions, an endless transformer core passing centrally around the U-shaped transformer secondary circuit, and a transformer primary coil wrapped around the core. Structure is provided to pass high frequency resistance welding electrical signals through each primary winding, which are phase related to assist each other during welding and structure is provided for applying forging pressure between the ends of the U-shaped transformer secondary circuits to effect two resistance welds simultaneously, the distance between which may be adjusted.

In another embodiment of the structure of the invention, a single welding transformer is used and the second transformer is replaced with two welding electrodes connected together electrically. While this method is not as efficient as the two transformer embodiment, it does allow even lower weight and smaller size of the welding apparatus in applications where that is paramount.

In accordance with the method of the invention, resistance spot welding structure which in a preferred embodiment may include single piece U-shaped transformer secondary members having integral electrode portions are fed high frequency, electrical resistance spot welding signals in phase so that push/pull welding is effected between the electrode portions of the secondary circuits of the transformer and forging pressure is applied between the transformer secondary members.

Unlike conventional resistance welders, in the preferred embodiment, the transformers move along with the welding electrodes to allow insertion of the work to be welded therebetween. Normally, having the welding transformers rigidly attached to and moving with the welding electrodes is impossible because the nature of the resistance welding process requires rapid movement of the welding electrodes, first apart, then toward each other as the metal being welded expands and then partially melts to form the weld. As the weld nugget is formed, the welding electrodes need to be free to move rapidly as the metal changes dimensions in order to maintain constant uniform forging pressure on the weld zone.

However, with the light weight of the high frequency transformers of this invention, this rapid movement is possible without resorting to flexible, current-carrying members between the transformer and welding electrodes.

Since, in this invention, the welding transformers and electrodes may be an integral unit, the nature of an integral transformer welding gun changes considerably. Unlike conventional integral transformer resistance welding guns, the structure of the gun does not conduct electricity. Therefore, it is possible to make the mechanical structure of the welding gun out of plastic or some other light weight but strong material. Since electrical conductivity is not a factor in materials selection, a much greater freedom of choice in materials is possible.

With the small transformers and the possibility of a very small and light welding gun, welding applications requiring portability and/or the ability to work into very restricted spaces are possible.

BRIEF DESCRIPTION OF THE DRAWINGS

FIG. 4 is a partial elevation view of one embodiment of the spot welding structure of the invention.

FIG. 5 is an elevation view of the structure of part shown in FIG. 4, taken in the direction of arrow 5 in FIG. 4.

FIG. 6 is a top view of the structure shown in FIG. 5, taken in the direction of arrow 6 in FIG. 5.

FIG. 7 is an elevation view similar to FIG. 4 of another embodiment of the spot welding structure of the invention.

DESCRIPTION OF THE PREFERRED EMBODIMENT

Figure 2:
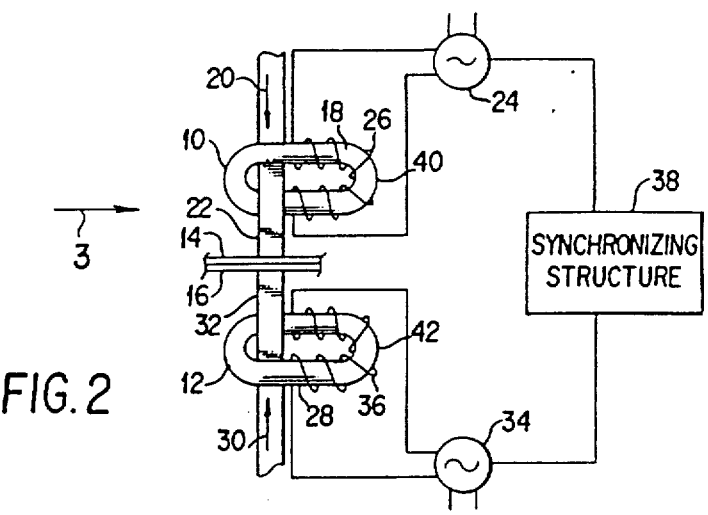
FIG. 2 is a diagrammatic elevation view of the dual transformer, high frequency, resistance spot welding structure of the invention for practicing the method of the invention.
Figure 3:
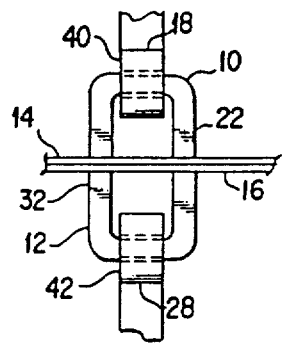
FIG. 3 is an elevation view of the welding structure illustrated in FIG. 2, taken in the direction of arrow 3 in FIG. 2.

The dual transformer, high frequency, resistance spot welding structure of the invention as shown in FIGS. 2 and 3 includes welding structures 10 and 12 on opposite sides of work pieces to be spot welded 14 and 16.

The welding structure 10 includes a transformer 18, means 20 for moving the transformer toward and away from a work piece and applying forging pressure to the secondary circuit member 22 of the transformer 10 which as will be seen later includes integral welding electrode portions, and a source 24 of high frequency welding electrical energy connected to the primary circuit 26 of transformer 10.

Similarly, the welding structure 12 includes a transformer 28, means 30 for moving the transformer toward and away from a work piece and applying forging pressure to the secondary circuit member 32 of the welding transformer 12 which also includes integral welding electrode portions and a source 34 of high frequency welding electrical energy connected to the primary circuit 36 of transformer 12.

Synchronizing structure 38 is provided between the source of electrical welding energy 24 and the source of electrical welding energy 34 to synchronize the electrical signals therethrough so that the welding energy is reinforced through the transformer secondary circuits 22 and 32 to effect push/pull welding as will be considered subsequently.

More specifically, the transformer secondary members 22 and 32 are alike and are constructed of a solid piece of conducting material, such as copper, suitable for use as welding electrodes. The transformer secondary members 22 and 32 thus are single piece transformer secondary members.

The transformer secondary members 22 and 32 may, for example, be U-shaped, as shown best in FIG. 2, with the U-shaped pieces being about two inches across the open end, two inches high and two inches thick. The transformer secondary members are aligned so as to be in mirror image relation to each other on opposite sides of the work pieces 14 add 16, as shown.

Figure 1:
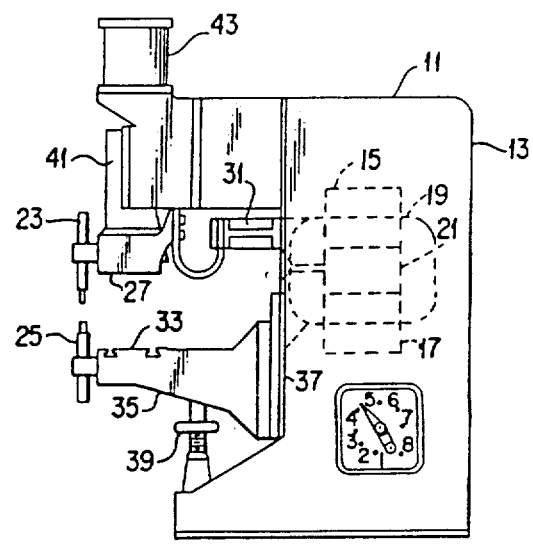
FIG. 1 is an elevation view of a prior art spot welding structure.

The transformers 10 and 12 further include cores 40 and 42, as shown best in FIG. 1, which are endless members that are generally rectangular in overall outline and which surround the center or connecting portions of the U-shaped transformer primary members associated therewith.

The transformer cores 40 and 42 may in fact be a part of a portable push/pull resistance spot welding structure. Thus, the cores 40 and 42 may be utilized to support the spot welding structures 10 and 12 adjacent the work pieces 14 and 16 at the area of the welds.

In operation, the welding structures 10 and 12 are positioned on opposite sides of the work pieces 14 and 16 with the ends of the integral transformer secondary members and electrodes aligned as shown. Synchronized high frequency electrical resistance spot welding signals are provided from the signal sources 24 and 34 synchronized by the synchronizing structure 38 so that the welding current passing through the transformer secondary circuit members 22 and 32 reinforce each other to provide two welds simultaneously between the ends of the transformer secondary members 22 and 32.

With such structure and on operation of the sources of electrical welding energy at high frequency of, for example, between 500 and 5000 hertz, the transformer cores 40 and 42, and therefore the transformer secondary circuit members 22 and 32 and primary windings 26 and 36, may be smaller as desired so that they can be positioned in portable welding units positioned adjacent the area to be welded on the work pieces 14 and 16. With such structure and method, a complete welding system may weigh under fifty pounds, with each welding transformer weighing about fifteen pounds.

In addition, as will be readily understood, the structure of the invention as described above and as shown in FIGS. 1 through 7 totally eliminates the long, heavy conductors, and the energy losses and maintenance problems of such conductors between welding electrodes and transformers of the prior resistance spot welding structures.

In the embodiment 48 of the invention as shown in FIGS. 4 through 6, welding transformers 50 and 52 are positioned on opposite sides of the work 54 and 56 to be resistance spot welded. The transformers 50 and 52, as shown in FIGS. 4 through 6, are identical, and again include primary and secondary circuits separated by a transformer core, not shown.

The transformers may be water cooled. To this end, a water inlet passage 58 and a water outlet passage 60 and water inlet and outlet passages 62 and 64 are provided in the transformers 50 and 52 respectively.

Opposed aligned welding electrodes 68, 70, 72 and 74 are connected to the transformer secondary circuits and are positioned in opposed relation on opposite sides of the work pieces 54 and 56, as best shown in FIG. 4.

The electrodes 68, 70, 72 and 74 are removable from the transformer secondary circuits they are associated therewith. Thus, the transformer secondary circuits may be any of a number of wound transformer secondaries having output terminals to which the electrodes may be secured.

Further, as will be understood by those in the art, the electrodes may be offset to vary the spacing between welds made thereby, alternatively, separate transformer secondary circuits may be provided with a fixed different spacing between electrodes attached thereto to provide different weld spacing.

As shown, the transformer structures 50 and 52 may each take up approximately one/sixteenth of a cubic foot while delivering up to 30,000 amps at the work pieces.

In addition, as set forth above, the transformers may be supported from a light weight frame structure, which may indeed be on non conductive material, such as plastic, since there is no necessity for passing current through the frame members of welding apparatus of which the transformers 50 and 52 are a part.

Forging force is applied directly to the transformers from opposite directions. Alternatively, if desired, one of the transformers may be stationary and forging force applied to the other transformer.

The transformers move with the electrodes to effect a spot weld and since they are light in comparison to prior spot welding transformers, they do not hinder th production rate of spot welding structure constructed in accordance with the invention.

In a third modification of the invention as shown best in FIG. 7, the transformer 52 has been replaced by a simple conductor 80 to which the electrodes 72 and 74 have been secured. As set forth above, this structure is not as effective as the two transformer embodiment, but it does provide welding structure of even lower weight and smaller size for use in applications wherein weight and size considerations are paramount.

While several embodiments of the present invention have been considered in detail along with modifications thereof, it will be understood that other embodiments and modifications are contemplated by the inventor. Thus, for example, as indicated, one or both of the transformer structures may be moved in any embodiment and the pressure for welding may be applied through a single structure associated with a single transformer secondary member if desired. Also if desired, the transformer secondary circuit member may be other than U-shaped, and in fact, as suggested, may be a conventional transformer winding with separate electrode members connected thereto with very short conductors. It will be understood that all embodiments and modifications of the invention as are defined by the appended claims are intended to be included within the scope of the invention.

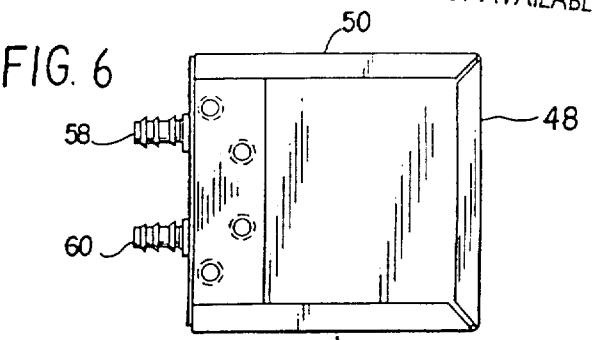
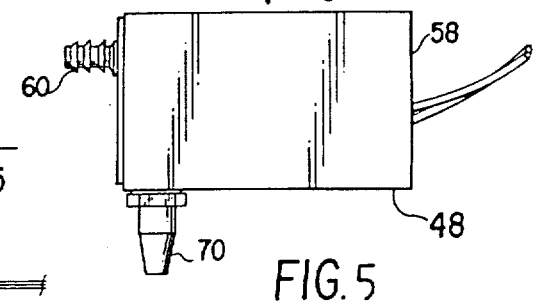
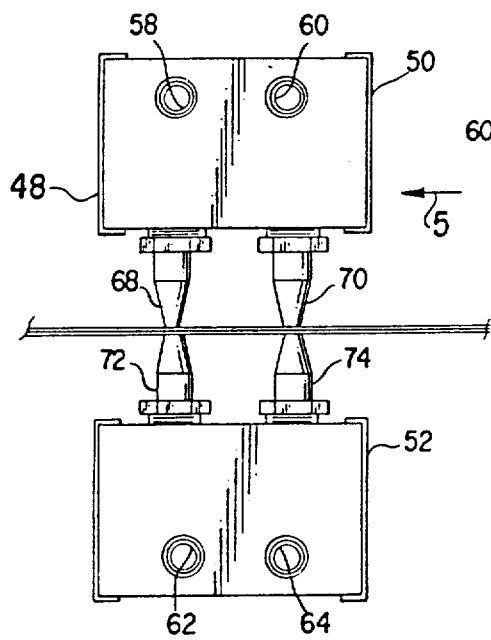
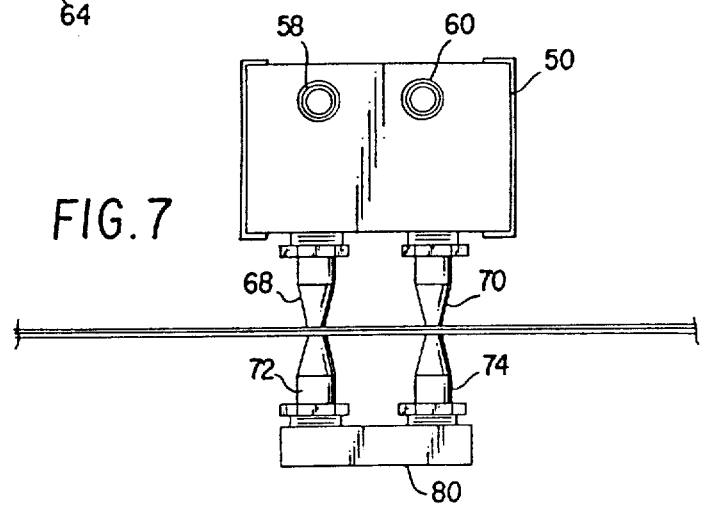

I claim:

1. A method of resistance spot welding with two small, light weight transformer structures including primary and secondary circuits, electrodes operably associated with the secondary circuits and a source of high frequency alternating electrical energy connected to the transformer primary circuits including placing the entire transformer structures on opposite sides of members to be welded together in close proximity to the members, energizing the transformer primary circuits from the source of high frequency electrical energy with a high frequency electrical signal, and moving the entire transformer, including the primary and secondary circuits thereof, toward the members to be welded to place the electrodes in contact with the members to be welded and supplying a forging force to the members through the transformer structures.

2. The method as set forth in claim 1 and including providing two spaced apart electrodes on each transformer, which electrodes are coaxial with each other on opposite sides of the members to be welded and effecting two welds simultaneously each time the transformers are energized and moved toward each other to place the aligned electrodes in contact with the members to be welded.

3. Structure as set forth in claim 2 and further including means for synchronizing the source of high frequency electrical energy to provide in phase resistance welding signals at the transformer secondary circuits on energizing the transformer primary circuits.

4. The method as set forth in claim 1 wherein the high frequency electrical signal is between 500 and 5000 Hertz.

5. The method as set forth in claim 1 and further including making the electrodes integral with the transformer secondary circuits.

6. The method as set forth in claim 1 and further including a applying the forging force directly to the welding electrode.

7. The method as set forth in claim 1 and further including passing coolant through the transformer secondary circuits and electrodes.

8. The method as set forth in claim 1 and further including synchronizing the source of high frequency electrical energy so that welding signals in the transformer reinforce each other.

9. The method as set forth in claim 1 and further providing only a single source of high frequency alternating electrical energy.

10. Structure for resistance spot welding comprising two small, light weight transformer structures, each containing primary and secondary circuits, electrodes connected to the secondary circuits, and a source of high frequency alternating electrical energy connected to the primary circuits, which entire transformers are positioned on opposite sides of members to be welded together in closed proximity to the members, structure for moving the entire transformers including the primary and secondary circuits thereof toward members to be welded to place the electrodes in contact with the members to be welded, and structure for applying a forging force to the members through the transformer structures whereby on energizing the transformer primary circuits with the electrodes in contact with the members to be welded together, a resistance spot welded is formed.

11. Structure as set forth in claim 10 and further including two spaced apart electrodes connected to each transformer secondary circuit, which electrodes are coaxial with each other on opposite sides of the members to be welded, whereby two welds are simultaneously effected each time the transformers are energized and moved towards the members to be welded to place the aligned electrodes in contact with the members to be welded.

12. Structure as set forth in claim 10 wherein the frequency of the source of high frequency alternating electrical energy is between 500 and 5000 Hertz.

13. Structure as set forth in claim 10 wherein the welding electrodes are integral with the secondary circuits.

14. Structure as set forth in claim 10 and further including means for applying the forging force directly to the welding electrodes.

15. Structure as set forth in claim 10 and further including means for passing a coolant through the transformer secondary circuits and electrodes.

16. Structure as set forth in claim 10 wherein the source of high frequency electrical energy is a single source.

* * * * *

UNITED STATES PATENT AND TRADEMARK OFFICE
CERTIFICATE OF CORRECTION

PATENT NO. : 4,831,229

DATED : May 16, 1989

Page 1 of 4

INVENTOR(S) : John F. Farrow

It is certified that error appears in the above-identified patent and that said Letters Patent is hereby corrected as shown below:

```
The title page should be deleted to appear as per attached title page.
The sheet of Drawing consisting of Figs. 1-7, should be added as
per attached sheets.
```

Signed and Sealed this

Twenty-fourth Day of August, 1993

*Attest:*

BRUCE LEHMAN

*Attesting Officer*

*Commissioner of Patents and Trademarks*

United States Patent [19]

Farrow

[11] Patent Number: 4,831,229
[45] Date of Patent: May 16, 1989

[54] HIGH FREQUENCY RESISTANCE SPOT WELDING STRUCTURE AND METHOD

[75] Inventor: John F. Farrow, Plymouth, Mich.
[73] Assignee: Medar, Inc., Farmington Hills, Mich.
[21] Appl. No.: 938,976
[22] Filed: Dec. 8, 1986
[51] Int. Cl.⁴ .................................. B23K 11/10
[52] U.S. Cl. ........................ 219/117.1; 219/116; 219/120
[58] Field of Search ............... 219/61.2, 63, 116, 119, 219/117.1, 120

[56] References Cited

U.S. PATENT DOCUMENTS

| | | | |
|---|---|---|---|
| 553,923 | 2/1896 | Lemp | 219/116 |
| 2,680,180 | 6/1954 | Worden et al. | 219/63 |
| 4,130,750 | 12/1978 | Bennett et al. | 219/119 |
| 4,496,821 | 1/1985 | Burgner et al. | 219/116 |

Primary Examiner—Clifford C. Shaw
Attorney, Agent, or Firm—Dale R. Small & Associates

[57] ABSTRACT

High frequency resistance spot welding structure and method. In one embodiment, the structure includes dual, mirror image welding transformers, each including a transformer secondary circuit, an endless transformer core, and a transformer primary winding wound around the transformer core. The transformer secondary circuits may be single member, U-shaped transformer secondaries with integral electrode portions. In another embodiment, one of the transformers is replaced by a pair of spaced apart welding electrodes which are connected by a conductor. Means are provided for supplying welding pressure to the transformers to move them with their associated welding electrodes during a weld sequence. A high frequency, electrical welding signal is applied to the transformer primary circuits which are synchronized when two transformers are used so that the welding currents passing through the transformer secondary circuits reinforce each other. The structure is small and light weight so as to be inexpensive, positioned immediately adjacent a weld, and moved quickly. The method of the invention includes providing the high frequency welding signal to the mirror image, closely spaced apart welding structures, synchronizing the high frequency welding signal to provide push/pull welding and providing forging pressure through the transformers or transformer to move them with their associated electrodes during spot welding.

16 Claims, 2 Drawing Sheets

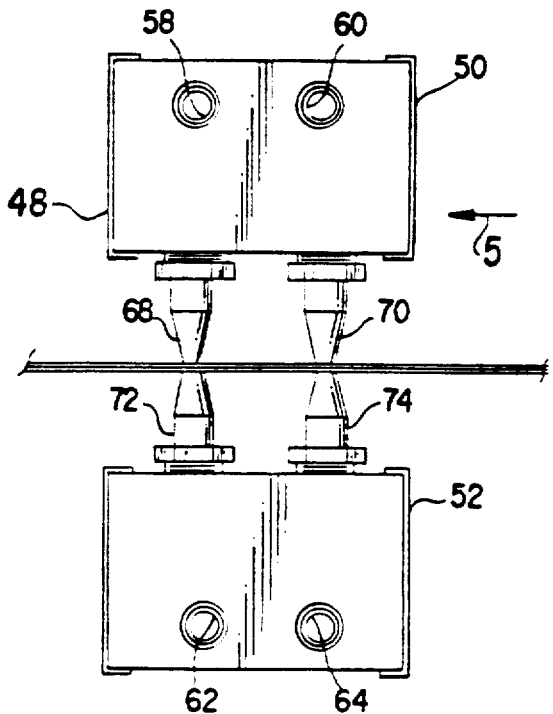

BEST AVAILABLE COPY